Sept. 11, 1928.
W. H. ROSE
1,683,727
LIQUID VALVE
Filed Sept. 23, 1927
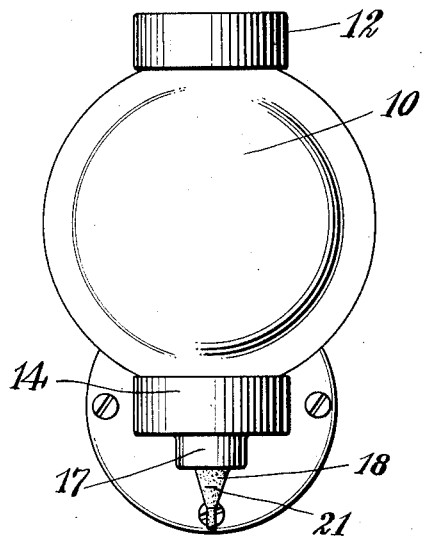
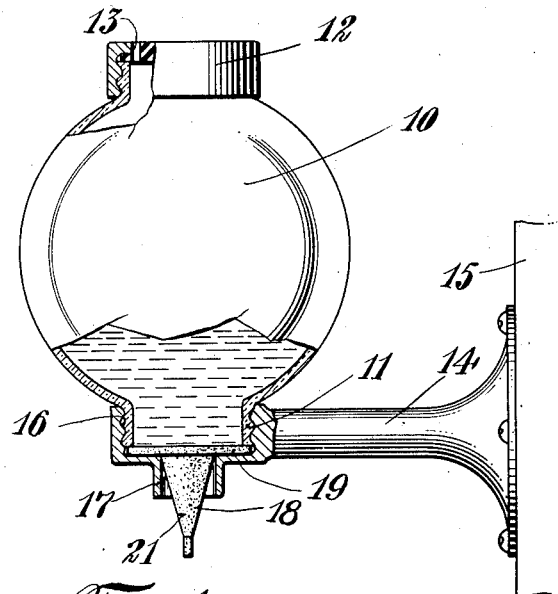
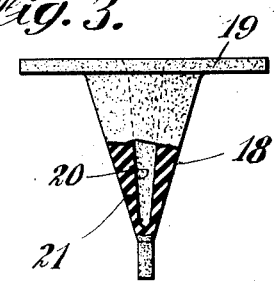
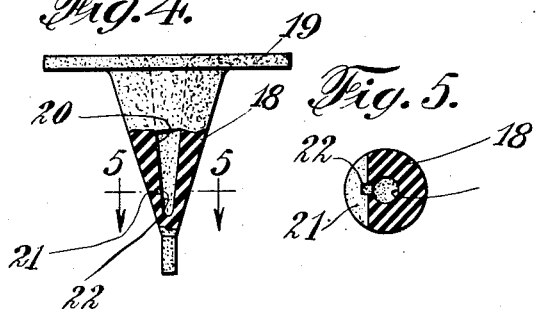
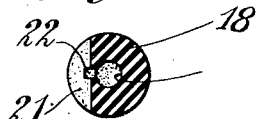
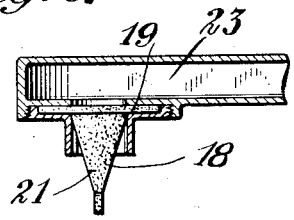
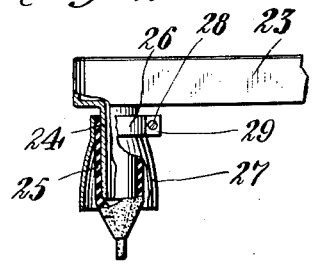
INVENTOR
William H. Rose
BY
ATTORNEY Patented Sept. 11, 1928.

1,683,727

UNITED STATES PATENT OFFICE.

WILLIAM H. ROSE, OF JERSEY CITY, NEW JERSEY.

LIQUID VALVE.

Application filed September 23, 1927. Serial No. 221,838.

My invention relates to valves and refers particularly to valves for liquid control.

One of the objects of my invention is a liquid valve which when connected to a non-metallic liquid receptacle will prevent contact between the liquid and metal parts.

Another object of my invention is a liquid valve composed entirely of resilient non-metallic materials.

Another object of my invention is a liquid valve, the resiliency of which will maintain it in normal closed position.

Another object of my invention is a liquid valve in which the rate of flow of liquid therethrough may be controlled and governed.

Another object of my invention is a liquid valve in which the solidifying of the liquid contents in the valve will not interfere with its operation.

Another object of my invention is a liquid valve capable of being operated by the hand upon which the liquid is deposited.

Another object of my invention is a liquid valve free from plungers and similar moving parts.

Another object of my invention is a liquid valve which prevents the sudden flow of excess liquid.

A consideration of this specification and its accompanying drawings will indicate that the valve of my invention possesses all of the above, and other, valuable features and that it presents an inexpensive and effective device for the control of liquid flows.

In the accompanying drawings illustrating modified forms of the device of my invention, similar parts are designated by similar numerals.

Figure 1 is a front view of one form of the device of my invention attached to a liquid receptacle.

Figure 2 is a side view of Figure 1, partly broken away for clearness of description.

Figure 3 is an enlarged vertical section of the valve of Figure 2.

Figure 4 is a vertical section of a modified form of my valve.

Figure 5 is a section through the line 5—5 of Figure 4.

Figure 6 is a vertical section of a modified form of my valve.

Figure 7 is a side view of a modified form of my valve, partly broken away for clearness of description.

The particular form of the device of my invention illustrated in Figure 1, 2 and 3, comprises a liquid receptacle 10, the downwardly extended exit neck 11 of which is externally threaded and having a closure 12 with an air duct 13.

A bracket support 14, capable of attachment to a wall, or partition, 15 has an internally threaded annular opening 16, capable of meshment with the threaded neck 11 of the receptacle 10. The support 14 has the downwardly extended cylindrical guard 17, the diameter of which is less than the diameter of the opening 16.

The valve illustrated in this form of my device comprises a resilient inverted cone 18 having the annular base flange 19 and an elongated recess 20 opening into the liquid receptacle 10, the valve extending below the guard 17. The walls of the valve decrease in thickness from the flange 19 toward the lower end of the recess 20. A transverse slit 21 is made in the wall 18 of the valve near the lower end of the recess 20 and preferably below the lower end of the guard 17. The resiliency of the material of the valve, the thickness of its wall and the size of the slit are such that the hydrostatic pressure of the liquid will not open the slit and that the valve will remain closed under normal conditions.

It is evident that a movement of the lower portion of the valve will open the slit and allow the passage of liquid therethrough, and that the release of the valve will cause it to return to its normal closed position.

In the modification of the valve of my invention as shown in Figures 4 and 5, the slit 21 passes only partly through the wall 18, and a puncture 22 connects the slit 21 with the recess 20.

As the amount of liquid passing through the valve is dependent upon the size of the opening into the recess 20, and as a slit in the outer portion of the wall 18 is necessary for the operation of the valve, it is evident that the quantity of liquid may be governed and controlled by the size of the opening into the recess 20, and that, therefore, an opening such as shown in this modification will allow of but a limited amount of liquid to pass therethrough. It is to be further noted, that this construction allows of increased closing pressure as the slit does not pass completely through the valve wall.

Figure 6 illustrates the valve shown in Figures 1, 2, and 3 attached to a horizontal liquid conduit 23. This form may be employed when a number of dispensers are fed from a common source of liquid supply.

It is evident that in order that the device may be operative the upper portion of the valve should remain practically stationary when the lower portion is moved, as otherwise the slit would not open; that is, the slit should produce a somewhat pivotal movement of the lower portion of the valve with the pivotal point opposite the slit.

In the forms previously described this result is obtained by making the walls of the valve of decreasing thickness from the upper portion downwardly toward the slit, but the same result can be obtained by other means, one of which such means is shown in Figure 7.

In this form of my device the liquid conduit 23 has a downwardly extended cylindrical neck 24. The valve member is similar to that shown in Figures 1, 2, and 3, except that the flange 19 is replaced by the upwardly extended cylindrical member 25, into which the neck 24 is inserted. The valve is retained upon the neck 24 by means of the split ring 26 which is extended downwardly into the guard 27. Abutment between the ring 26 and the resilient member 25 is accomplished by the screw 28 passing through two extended flanges, as 29, of the ring 26.

In this form of my device, the stiffening of the upper portion of the valve is accomplished by the neck 24.

To use my device, the operator places the lower end of the valve in the palm of his hand and moves it slightly away from the slit, thus allowing the liquid to flow into the hand. The removal of the hand causing the valve to return to its normal closed position.

A consideration of the foregoing description indicates the following advantages of my device; it is applicable to all forms of liquid dispensers, the liquid is maintained from contact with metals, it prevents the escape of liquid, the drying of soap in its use with liquid soap does not depreciate its effectiveness as the opening of the valve breaks such contact, it can be readily applied to the liquid receptacle, it can be operated with one hand, it presents a sudden exit of excess liquid, the flow of liquid can be governed, it closes automatically, it is free from plungers and similar moving parts, it is hygienic, it can be readily removed and cleaned and it is economical.

My device, therefore, presents a highly efficient valve for the control of liquids.

I do not limit myself to the particular size, shape, number, arrangement or material of parts as shown and described as these are given simply as a means for clearly describing my invention.

What I claim is:—

1. A resilient valve body having a longitudinal recess therein and a resiliently normally closed aperture through the side of the valve wall into said recess so positioned that a transverse movement of the valve portion below the aperture will open said aperture.

2. A resilient valve body the wall of which increases in thickness toward its base having a longitudinal recess therein and a resiliently normally closed aperture through the side of the valve wall into said recess so positioned that a transverse movement of the valve portion below the aperture will open said aperture.

3. A resilient conical valve body having a longitudinal recess therein and a resiliently normally closed aperture through the side of the valve wall into said recess so positioned that a transverse movement of the valve portion below the aperture will open said aperture.

4. A resilient conical valve body the wall of which increases in thickness toward its base having a longitudinal recess therein and a resiliently normally closed aperture through the side of the valve wall into said recess so positioned that a transverse movement of the valve portion below the aperture will open said aperture.

5. A resilient valve body having a longitudinal recess therein, a resiliently normally closed slit partially through the side of the valve wall and a smaller aperture connecting said slit with said recess so positioned that a transverse movement of the valve portioned below the aperture will open said slit.

6. A resilient valve body the wall of which increases in thickness toward its base having a longitudinal recess therein, a resiliently normally closed slit partially through the side of the valve wall and a smaller aperture connecting said slit with said recess so positioned that a transverse movement of the valve portion below the aperture will open said slit.

7. A resilient conical valve body having a longitudinal recess therein, a resiliently normally closed slit partially through the side of the valve wall and a smaller aperture connecting said slit with said recess so positioned that a transverse movement of the valve portion below the aperture will open said slit.

8. A resilient conical valve body the wall of which increases in thickness toward its base having a longitudinal recess therein, a resiliently normally closed slit partially through the side of the valve wall and a smaller aperture connecting said slit with said recess so positioned that a transverse movement of the valve portion below the aperture will open said slit.

WILLIAM H. ROSE.